(12) United States Patent
Neugebauer et al.

(10) Patent No.: US 12,249,823 B2
(45) Date of Patent: Mar. 11, 2025

(54) ELECTRONIC DEVICE AND COMMUNICATION UNIT

(71) Applicant: WAGO Verwaltungsgesellschaft mbH, Minden (DE)

(72) Inventors: Philipp Neugebauer, Bueckeburg (DE); Stefan Wagner, Hille (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 254 days.

(21) Appl. No.: 17/484,926

(22) Filed: Sep. 24, 2021

(65) Prior Publication Data

US 2022/0123543 A1    Apr. 21, 2022

Related U.S. Application Data

(63) Continuation of application No. PCT/EP2020/058141, filed on Mar. 24, 2020.

(30) Foreign Application Priority Data

Mar. 27, 2019    (DE) .................... 20 2019 101 744.9

(51) Int. Cl.
*H02H 3/08*     (2006.01)
*H02H 1/00*     (2006.01)
*H02H 9/02*     (2006.01)

(52) U.S. Cl.
CPC ............ *H02H 3/08* (2013.01); *H02H 1/0007* (2013.01); *H02H 1/0092* (2013.01); *H02H 9/02* (2013.01)

(58) Field of Classification Search
CPC ...... H02H 3/08; H02H 1/0007; H02H 1/0092; H02H 9/02; H02H 3/087; H02H 3/105;
(Continued)

(56) References Cited

U.S. PATENT DOCUMENTS 4,937,757 A * 6/1990 Dougherty ........... H02H 3/0935
361/97
5,392,196 A     2/1995 Kinner
(Continued)

FOREIGN PATENT DOCUMENTS

CN    201113789 Y    9/2008
CN    105637753 A    6/2016
(Continued)

OTHER PUBLICATIONS

International Preliminary Report on Patentability dated Sep. 28, 2021 in corresponding application PCT/EP2020/058141.
(Continued)

*Primary Examiner* — Danny Nguyen
(74) *Attorney, Agent, or Firm* — Muncy, Geissler, Olds & Lowe, P.C.

(57) ABSTRACT

An electrical energy supply device for supplying electrical energy to electrical components from an energy source, the energy supply device including at least one program memory with a computer program stored therein, and a computer for running the computer program, the computer program including software control functions for controlling power supply functions of the energy supply device, characterized in that the energy supply device includes at least one electronic overcurrent circuit breaker implemented in software with the aid of the computer program.

22 Claims, 2 Drawing Sheets

(58) Field of Classification Search
CPC ............... H02H 7/1213; G05B 19/058; H02M 3/33507
USPC .................................... 361/86–87, 93.7–93.9
See application file for complete search history.

(56) References Cited

U.S. PATENT DOCUMENTS

| | | | |
|---|---|---|---|
| 6,445,086 | B1 | 9/2002 | Houston |
| 6,483,317 | B1 | 11/2002 | Floro et al. |
| 6,496,342 | B1* | 12/2002 | Horvath ............ H02J 13/00002 361/64 |
| 6,556,405 | B2 | 4/2003 | Sudou et al. |
| 6,639,776 | B2 | 10/2003 | Sudou et al. |
| 7,551,416 | B2 | 6/2009 | Chou |
| 9,350,156 | B2 | 5/2016 | Kanzaki et al. |
| 9,774,261 | B2 | 9/2017 | Bui et al. |
| 9,906,143 | B1* | 2/2018 | Yu .................... H02M 3/33592 |
| 10,374,411 | B2 | 8/2019 | Mattos et al. |
| 10,847,964 | B2 | 11/2020 | Mattos et al. |
| 10,944,289 | B2 | 3/2021 | Calvin et al. |
| 2008/0249666 | A1 | 10/2008 | Buterbaugh et al. |
| 2009/0021880 | A1 | 1/2009 | Flay et al. |
| 2011/0271125 | A1 | 11/2011 | Sivertsen |
| 2013/0294111 | A1* | 11/2013 | Persson ................ H02H 7/1213 363/16 |
| 2016/0204613 | A1 | 7/2016 | Calvin et al. |
| 2020/0028352 | A1* | 1/2020 | Strouse ................... H02M 3/08 |
| 2022/0200307 | A1* | 6/2022 | Dono ................... H01M 50/583 |

FOREIGN PATENT DOCUMENTS

| | | |
|---|---|---|
| CN | 205636092 U | 10/2016 |
| CN | 208209819 U | 12/2018 |
| CN | 109314465 A | 2/2019 |
| DE | 19733250 A1 | 2/1999 |
| DE | 102006053415 B3 | 12/2007 |
| DE | 102014222172 A1 | 11/2015 |
| DE | 112017002499 T5 | 2/2019 |
| EP | 0602305 A1 | 6/1994 |
| EP | 1118918 A2 | 7/2001 |
| WO | WO2015020632 A1 | 2/2015 |

OTHER PUBLICATIONS

Chinese Office Action dated Nov. 22, 2023 in corresponding application 202080024316.8.

* cited by examiner

ELECTRONIC DEVICE AND COMMUNICATION UNIT

This nonprovisional application is a continuation of International Application No. PCT/EP2020/058141, which was filed on Mar. 24, 2020, and which claims priority to German Patent Application No. 20 2019 101 744.9, which was filed in Germany on Mar. 27, 2019, and which are both herein incorporated by reference.

BACKGROUND OF THE INVENTION

Field of the Invention

The present invention relates to an electronic device. The electronic device may be, for example, an electrical energy supply device for supplying electrical energy to electrical components from an energy source and/or an electronic circuit breaker. The invention relates, in particular, to the field of electronic devices for industrial systems, in particular for industrial controllers, such as programmable logic control systems. The invention also relates to a communication unit of an electronic device and an assortment of multiple communication modules.

Description of the Background Art

An energy supply device is used to provide electrical power on a certain voltage level, for example 12 volts or 24 volts, and of a certain voltage type, for example DC voltage, the energy supply device providing this electrical energy supply, for example from a power supply network, such as an AC supply network. The electronic device includes corresponding components for converting and/or rectifying the electrical energy provided from the power supply system, for example in the form of a clocked conversion circuit, if the device is a switched-mode power supply, and/or at least one transformer.

In the area of industrial power supply, strict requirements are imposed on the reliability and functionality of electronic devices of this type.

SUMMARY OF THE INVENTION

It is therefore an object of the invention to provide a further improved electronic device.

To achieve this object, the electronic device may include control electronics, which include at least one program memory, with a computer program stored therein, and a computer for running the computer program. The computer program includes software control functions for controlling functions, for example power supply functions, of the electronic device. In this way, the electronic device may be implemented with a multiplicity of functions, which may each be implemented by software. The electronic device may therefore also be updated, i.e., a further developed computer program may be stored without changes to the hardware.

The electronic device may include a parameter memory, in which parameters may be stored for defining the functionality of the electronic device. Due to parameters of this type, certain details of the functions of the electronic device may be set as needed by the user and adapted to the particular application.

The electronic device can include at least one communication device coupled with the control electronics, by means of which the electronic device is configured for data communication with an external computer device. In this way, a data exchange between the external computer device and the electronic device is possible, for example to real out operating data of the electronic data or to set and/or control certain functions of the electronic device by the external computer device. The storage of variable parameters in the electronic device is also possible if the latter includes a parameter memory.

The external computer device may be an arbitrary computer, such as a laptop or a PC. The external computer device may also be a control device of a programmable logic control system or another device of a programmable logic control system of this type. The external computer device may be a device connected to a data bus. For this purpose, the electronic device may be coupled with the data bus via the communication unit.

The communication unit can be designed as an exchangeable communication module, the communication module having a gateway functionality, by means of which a bidirectional conversion takes place between an external communication protocol and/or physical layer used by the external computer device and an internal communication protocol and/or physical layer used between the communication module and the computer, the communication module supporting either exactly one external communication protocol or multiple external communication protocols. In the direction of the computer of the electronic device, the communication module thus works with the internal communication protocol and/or physical layer, and in the direction of the external computer device, it works with the external communication protocol and/or physical layer. Due to the gateway functionality, the communication module may carry out a conversion from the external communication protocol to the internal communication protocol as well as in the opposite direction from the internal communication protocol to the external communication protocol. The same applies to the conversion between the internal physical layer and the external physical layer. The physical layer in the OSI layer mod& is understood to be the physical layer.

This has the advantage that the communication module, and thus its gateway functionality and, in particular, the supported external communication protocol and/or physical layer, may be easily replaced in that a communication module is removed from the electronic device and another communication module is connected to the electronic device. In this way, the electronic device may be adapted without a great deal of complexity to different external communication protocols and/or physical layers. The internal communication protocol may be, for example, an arbitrary field bus communication protocol, such as Modbus RTU.

A further advantage of a modular communication concept of this type is that one and the same communication module may be initially used for a certain electronic device and used for a different electronic device or another device at a later point in time. The costs associated with the communication interface are consequently not assigned to the electronic device or the other device, but to the communication module.

The external communication protocol can be a bus protocol or a P2P protocol, which supports the data communication of multiple external computer devices connected to a common data bus. This has the advantage that the electronic device may be made bus-capable by the communication module. The external communication protocol may be, for example, an arbitrary field bus communication protocol, such as IO-Link, Ethernet/IP, EtherCAT, Interbus, Safety-BusP, Profibus, Sercos, Modbus RTU and the like.

The communication module may be configured to carry out cyclical communications and/or acyclic communications with the computer of the electronic device.

The communication module can be configured to read out an identifier, which indicates the device type of the electronic device, from the control electronics of the electronic device via the internal communication protocol and to transmit it to the external computer device via the external communication protocol. This has the advantage that the electronic device may always identify itself as an electronic device of this type, in particular in a data transmission environment including multiple communication participants, for example when the communication module is connected to a data bus, regardless of the internal and external communication protocols used. In this way, the electronic device may be identified by other data transmission participants as an electronic device of this type, regardless of the communication module connected in each case.

The communication module can be configured to convert a command received from the external computer device via the external communication protocol for the block parameterization of the control electronics into the internal communication protocol, so that a multiplicity of parameters may be written to the control electronics, in particular to its parameter memory, with the aid of the command for block parameterization. The new parameter set may be collectively activated in this way. This has the advantage that the electronic device may be parameterized in a "block" with the aid of the command received via the external communication protocol, using a block parameterization of this type, even when using an internal communication protocol which does not recognize a command for block parameterization having the same effect, i.e., a multiplicity of parameters may be transmitted quickly and easily and stored in the electronic device with one command.

The communication module can be configured to convert a data storage command received from the external computer device via the external communication protocol into selected functions of the internal communication protocol, possibly in multiple steps, parameter data of the control electronics being read out by the communication module and transmitted to the external computer device, and/or parameter data from the external computer device being written to the control electronics via the communication module. In this way, the electronic device may also be made suitable for an externally received data storage command, even if the internal communication protocol does not recognize such a command having the same effect. The received data storage command is then converted by the communication module into existing, selected functions of the internal communication protocol, which may possibly take place in multiple steps, i.e. using functions of the internal communication protocol carried out in consecutive steps. An up-to-date parameter set of the control electronics of the electronic device may be read out by the data storage command and transmitted to the external computer device, where the parameter set may then be stored. A new parameterization of the electronic device may then take place, for example, by transmitting a new parameter set to the control electronics with the aid of a command for block parameterization. In particular, a backup functionality of a parameter set of the electronic device may be implemented by the data storage command via the communication module.

The communication module can have or permits a password protection, so that an external computer device communicating with the electronic device via the communication module must carry out a password authentication at least when accessing certain functions of the control electronics. In this way, an increased security against operator errors and, in particular, against manipulation of the electronic device, is ensured. This increased security is implemented by a password protection in the communication module, by means of which an arbitrary, unauthenticated access at least to certain functions of the control electronics is prevented. The external communication unit must initially carry out a password authentication, i.e., transmit a correct password to the communication module before the communication module releases the access to certain functions of the control electronics.

The electronic device can be designed as an electrical energy supply device for supplying electrical energy to electrical components from an energy source and/or as an electronic circuit breaker. The electrical energy supply device may be designed as a power supply unit, for example as a power supply unit of an industrial controller, in particular a programmable logic control system, as a switched-mode power supply and/or as an uninterruptible power supply (USP). This has the advantage that the electronic device may be implemented in a wide range of variants. The same module communication concept with the exchangeable communication modules, may be used in each case. In other words, the communication modules may be used independently of the type of implementation of the electronic device. The identifier readable from the control electronics of the electronic device, which indicates the device type of the electronic device, may in this regard have, for example, a distinction between an electronic device of an industrial controller, a switched-mode power supply and/or an uninterruptible power supply.

The communication module can be connectable to a housing of the electronic device from the outside, with the aid of an electrical plug connection. This permits an easy exchange of the communication module as well as an easy attachment of the communication without a tool. The communication module may include, for example, latching elements, with the aid of which the communication module may be engaged with the housing of the electronic device and fixed in this way on the housing of the electronic device.

The communication module may include a separate control computer, which runs a computer program stored in the communication module. In particular, an efficient conversion between the external communication protocol and the internal communication protocol may take place in this way, in particular if this requires a certain calculating effort and/or memory demand. The communication module may also be designed without a separate control computer, which is advantageous, for example, if the external communication protocol is identical to the internal communication protocol or only slightly deviates therefrom. For example, the communication module may include only one hardware-based interface circuit in such cases, for example, for adapting voltage levels of the physical layer.

The electronic device can include a hardware-based detection circuit, by means of which the control electronics may detect whether a communication module having a separate control computer or a communication module without a separate control computer is connected to the electronic device. This has the advantage that the electronic device may automatically determine with little effort which type of communication module is connected to the electronic device. Accordingly, the electronic device may automatically adapt its communication functions to the communication module connected in each case. In communication modules without a separate control computer, the computer of the electronic device may take over certain control functions of the communication module, such as the activation of a control input of the communication module for setting the data transmission direction.

The electronic device can be configured for an exchange of the communication module during operation (hot plug). The flexibility of the adaptation of the electronic device to different needs is further increased hereby. The electronic device may be configured to automatically adapt changed interface parameters of its communication interface to the communication module after the exchange of the communication module. The adaptation of the communication parameters may also be requested by the newly connected communication module.

The object mentioned at the outset is also achieved by a communication unit of an electronic device of the type explained above. The communication unit is designed as an exchangeable communication module, the communication module having a gateway functionality, by means of which a bidirectional conversion takes place between an external communication protocol and/or physical layer used by the external computer device and an internal communication protocol and/or physical layer used between the communication module and the computer, the communication module supporting either exactly one external communication protocol or multiple external communication protocols. The advantages explained above may also be achieved hereby.

The invention also relates to an assortment of multiple communication modules of the type explained above, the communication modules of the assortment each having the same internal communication protocol and/or physical layer, but having different external communication protocols and/or physical layers. Due to an assortment of this type, electronic devices having an exchange capability of the communication modules may be adapted as needed to different external communication protocols and/or physical layers.

A communication module may be added to the assortment, which has, as the external communication protocol and/or physical layer, the same communication protocol and/or physical layer as the internal communication protocol and/or physical layer. This communication module may be designed, for example, without a separate control computer.

For example, if the IO Link protocol is used as the external communication protocol, the communication module may be configured to carry out the following functions:

Start phase: Parameterization and initialization of IO-Link communication with data read out from the electronic device (identification block).

Process data: Cyclical Modbus requests, synchronized with IO-Link requests, or asynchronously with IO-Link requests.

Parameter data: Translation and retranslation of IO-Link to Modbus, conversion of IO-Link indices into Modbus addresses for this purpose by constant offset, mapping of Modbus error messages to IO-Link error messages, forwarding of events to IO-Link master.

BlockParameterization—BP:

Communication module places the electronic device into the BP state when it has received an IO-Link BP start command.

The electronic device does not take over written parameter values directly during active configuration but instead stores them temporarily.

Written parameter values become active if a BP stop command is transmitted and none of the write requests were faulty during the BP.

The BP result is transmitted to the IO-Link master.

Data Storage—DS

At the request of the IO-Link master, the communication module reads indices from the electronic device (fixedly defined address) and compiles the DS-IndexList, which is made available to the IO-Link master.

The communication module places the electronic device into the BP state (the electronic device treats the following requests as block parameterization) when the parameter set is written.

Handling is like normal read requests when the parameter set is read.

CRC provision of the parameter set from the electronic device.

The electronic device includes connections for outputting the electrical power for supplying power to the electrical components (consumers). These connections may also be referred to as power supply output connections of the electronic device. According to one advantageous embodiment, the electronic device includes, as a further connection, at least one controllable digital or analog output connection and/or at least one digital or analog input connection. In the case of a controllable digital or analog output connection, the latter is controllable by the external computer device via the communication unit. In the case of a digital or analog input connection, an input value may be read out from this input connection by the external computer device via the communication unit. This has the advantage that at least one simple remote I/O functionality may be additionally provided via the electronic device. The digital or analog output connection is therefore an output of a remote I/O unit of this type, while the digital or analog input connection is an input of a remote I/O unit of this type. Accordingly, at least simple control and monitoring tasks may be carried out with the aid of the electronic device, so that in many cases no additional I/O module is required in the system. Existing I/O connections of the electronic device, which are present in any case, for example, for certain standard functions, such as displaying the current voltage level ("DC OK"), may be used to realize the digital or analog input connection and/or the digital or analog output connection. Accordingly, the necessary hardware complexity for the electronic device is not increased upon providing the aforementioned remote I/O functionality.

Due to this remote I/O functionality, the electronic device may function as a digital remote station, which may be used, for example, for state or function monitoring with the aid of the data communication. This remote I/O functionality may be implemented by a pure software extension, i.e., by corresponding code of the computer program. Additional hardware is thus not necessary.

If the digital or analog input connection is designed as a digital input connection, only binary input values are provided (0 and 1). If the digital or analog input connection is designed as an analog input connection, input values having a certain value range are provided, for example having 8 bits (0 to 255) or 12 bits (0 to 4095), depending on the resolution of an analog/digital converter used.

If the digital or analog output connection is designed as a digital output connection, only binary output values are provided (0 and 1). If the digital or analog output connection is designed as an analog output connection, output values having a certain value range are provided, for example having 8 bits (0 to 255) or 12 bits (0 to 4095), depending on the resolution of an analog/digital converter used.

The electronic device can include exactly one controllable digital or analog output connection. The complexity is minimized hereby for the remote I/O functionality, since a single controllable digital or analog output connection is generally required in any case in an electronic device of this type.

The electronic device can include exactly one digital or analog input connection. The complexity is minimized hereby for the remote I/O functionality, since a single controllable digital or analog input connection is generally required in any case in an electronic device of this type.

The electronic device can include a parameter memory, in which parameters for defining the functionality of the electronic device may be stored, the functionality of the digital or analog input connection and/or the functionality of the controllable digital or analog output connection being settable by at least one parameter. This has the advantage that the functionality of the digital or analog input connection or the digital or analog output connection may be selected and set accordingly by the user. The flexibility of the use of the electronic device is further increased hereby. The functionality of the digital or analog input connection may be switched, for example, between two different functions or a greater number of different functions. The functionality of the digital or analog output connection may be switched, for example, between two functions or a greater number of different functions.

The functionality of the digital or analog input connection may be set at least to a fixedly predefined standard input function with the aid of at least one parameter, and/or the functional of the controllable digital or analog output connection may be set at least to a fixedly predefined standard output function with the aid of at least one parameter. This simplifies the selection of the functionality of the digital or analog input connection or the digital or analog output connection for the user.

The standard output function may be the output of a signal to the controllable digital or analog output connection, which indicates whether the voltage of the electronic device output at the connections for outputting the electrical energy is within a permissible range. Accordingly, the digital or analog output connection may be set to a standard function as a "DC OK" connection.

The standard input function can be a remote-controllable activation/deactivation, via the digital or analog input connection, of the electronic device or the energy output at the connections for supplying the electrical power. Accordingly, the digital or analog input connection may be used in the standard function as a remote-control connection for the electronic device.

The electronic device can include at least one electronic overcurrent circuit breaker implemented in software with the aid of the computer program. An overcurrent circuit breaker functionality, which is at least essentially implemented in software, may thus be advantageously added to the electronic device. An electronic device is thus combined with an at least single-channel electronic circuit breaker functionality within one device. This has the advantage that an external overcurrent circuit breaker may generally be dispensed with. The user may save costs and installation space hereby. The flexibility for the user is also increased. In addition, the external wiring is simplified because no additional wiring complexity is necessary for an external overcurrent circuit breaker.

The electronic overcurrent circuit breaker can be implemented solely by the computer program without any additional hardware components. Hardware which is available in the electronic device in any case is thus used to realize the functionality of the electronic overcurrent circuit breaker. To be fully functional, the circuit breaker software may thus use only the hardware which also uses the software to control the electronic device or specifically the energy supply device itself.

The electronic overcurrent circuit breaker can comprise a function for cutting off the output current output by the electronic device and/or a function for limiting the output current output by the electronic device to a predetermined current value. The cutoff may comprise a permanent cutoff of the output current or a temporary cutoff of the output current. The same applies to the limiting of the output current, which may be either permanent or temporary. The function of the electronic overcurrent circuit breaker may also comprise a switching between the cutoff of the output current and the limiting of the output current.

The cutoff of the output current output by the electronic device or the limiting of the output current output by the electronic device can take place by the primary-side control of the electronic device. For example, the main transmitter, for example the transformer, may be controlled on the primary side. This permits a simple realization of the electronic overcurrent circuit breaker functionality. The energy supply, and thus the output of the output current, may thus be stopped or set to a lower amount, in that the actual transformer of the electronic device is no longer actively controlled on the primary side.

The electronic device can have a current measurement in the output branch for realizing the electronic overcurrent circuit breaker functionality. Due to the current measurement, it may be established whether the output current is too high, and the electronic overcurrent circuit breaker must respond accordingly to carry out the cutoff or limiting of the output current.

The electronic overcurrent circuit breaker can have a monitoring of the output current output by the electronic device for the exceeding of a limit current value, a cutoff of the output current or a limiting of the output current to a predetermined current value, for example the limit current value, taking place upon exceeding the limit current value. The output current output may be determined via the aforementioned current measurement. The computer may be used to compare whether the measured output current exceeds the limit current value. Accordingly, the computer may initiate corresponding counter-measures, such as the cutoff of the output current or the limiting of the output current.

The cutoff of the output current or the limiting of the output current can take place only after a predetermined tripping time, during which the output current exceeds the limit current value continuously or predominantly over time. This has the advantage that the electronic overcurrent circuit breaker functionality does not inevitably respond whenever the limit current value is slightly briefly exceeded, but only after the predetermined tripping time.

The electronic device can include a parameter memory, in which parameters may be stored for defining the functionality of the electronic device, the electronic overcurrent circuit breaker being configurable by one or multiple of the parameters settable in the parameter memory as desired by the user. This has the advantage that the circuit breaker functionality may be adapted to the needs of the user. In particular, the tripping time and/or the limit current value may be set as parameters. Due to the possibility of setting the tripping time, both "fast-acting" and "slow-acting" circuit breaker characteristics may be set.

The parameters may be set in the parameter memory of the electronic device via the communication unit with the aid of the external computer device. The setting of the circuit breaker functionality is thus also possible remotely. In addition, an easy possibility for changing the parameters is given.

The response of the overcurrent circuit breaker, for example the triggering of the limiting and/or cutoff of the supplied output current, may be signaled via a luminous feedback and/or via a communication interface. For this purpose, luminous signal indicators, for example LEDs, which exist in any case, may advantageously be used to display the load of the electronic device during normal operation. However, various flashing codes (outside of normal operation) may also signal special states, such as the circuit breaker functionality. The aforementioned communication unit of the electronic device may be used as the communication interface.

The electronic device may have a logging function, in which the activity of the electronic overcurrent circuit breaker functionality is logged. For example, when and how long the electronic overcurrent circuit breaker carries out the cutoff of the output current and/or the limiting of the output current may be logged. The log file may be read out from an external computer device via the communication unit of the electronic device. Improved diagnosis capabilities for the user may be provided hereby.

Further, it may be provided that the electronic device includes a housing, on which mounting rail fastening elements are arranged, by means of which the electronic device may be fastened to a mounting rail of the electrical installation system. In this way, the electronic device, like other components of an industrial control system, may be fastened to the mounting rail, for example lined up next to other devices. The electronic device may be, for example, snapped onto the mounting rail.

The indefinite article a/an is not to be understood as a numeral within the meaning of the present invention. For example, when a component is mentioned, this is to be interpreted in the sense of "at least one component." To the extent that angle details are given in degrees, they relate to a circular dimension of 360 degrees (360°). To the extent that a computer is mentioned, it may be configured to run a computer program, for example in the sense of software. The computer may be designed as a commercially available computer, for example as a PC, laptop, notebook tablet or smartphone or as a microprocessor, microcontroller or FPGA, or as a combination of elements of this type. To the extent that a regulation is mentioned, a regulation differs from a control in that a regulation has a feedback or back-coupling of measured or internal values, with the aid of which the generated output values of the regulation, in turn, may be influenced in the sense of a closed control loop. In a control, a pure controlling of a variable takes place, without a feedback or back-coupling of this type.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
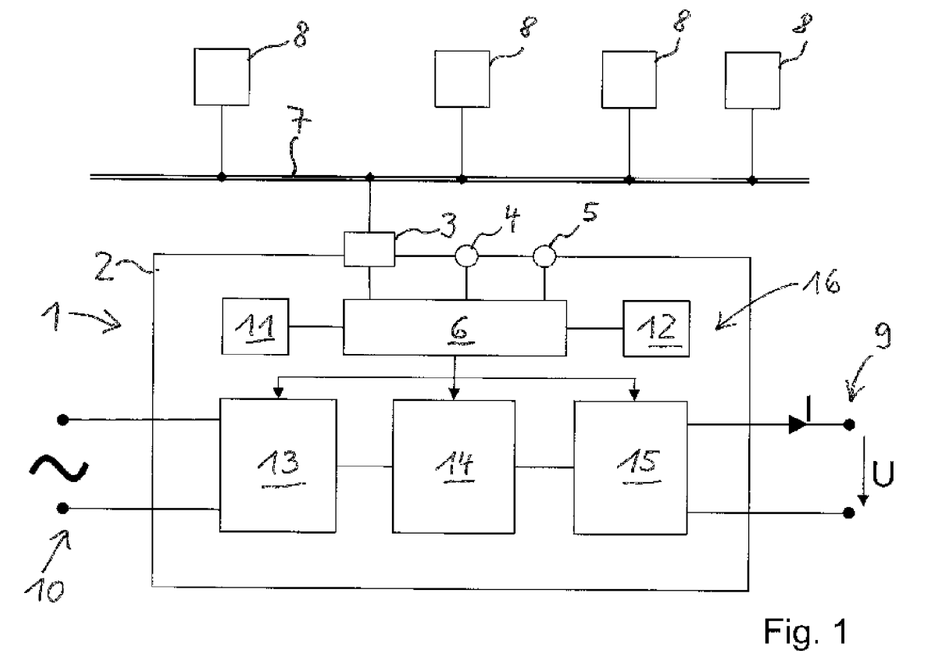
FIG. 1 shows a schematic representation of an electronic device.

FIG. 1 shows an electronic device 1, which includes a housing 2. Control electronics 16 of electronic device 1 is arranged in housing 2. Power electronic components 13, 14, 15 are also situated in housing 2. The electronic device includes input connections 10, with the aid of which electronic device 1 is to be connected to a power supply network, for example, an AC network. Electronic device 1 is used to convert the electrical power received from the power supply network via input connections 10 into electrical energy output on the output side, which is provided to energy supply output connections 9. For example, an output current I with an output voltage U, for example a DC voltage, may be provided at energy supply output connections 9.

Power electronic components 13, 14, 15 may comprise primary-side components 13 and secondary-side components 15. A transformer 14 may also be present between primary-side components 13 and secondary-side components 15.

Control electronics 16 include a computer 6, a program memory 11 and a parameter memory 12. Computer 6 is connected to program memory 11 and parameter memory 12. A computer program is stored in program memory 11. The computer program includes software control functions for controlling power supply functions of electronic device 1, for example regulating functions to keep output voltage U and/or output current I constant. Parameters for the user-specific definition of the functionality of the electronic device are stored in parameter memory 12, for example to select different options or sub-functions in the software control functions. Computer 6 runs the computer program and takes into account corresponding parameters from parameter memory 12. Computer 6 controls power electronic components 13, 14, 15 in such a way that a desired output current I and/or a desired output voltage U is/are provided at energy supply output connections 9.

With the aid of further software functions present in the computer program, the computer carries out an electronic overcurrent circuit breaker functionality and/or a remote I/O function, as explained at the outset.

With respect to the remote I/O function, computer 6 is connected to additional connections of the electronic device, which comprise at least one controllable digital or analog output connection 4 and at least one digital or analog input connection 5. Computer 6 may read in an input signal, for example a digital value or an analog value, via digital or analog input connection 5. Computer 6 may output a digital or analog output signal at output connection 4. Connections 4, 5 do not have to be connected directly to computer 6 but may be decoupled therefrom via suitable interface circuits.

Computer 6 is also connected to a communication unit 3. Computer 6, and thus electronic unit 1, may carry out a data communication with external computer devices 8 via communication unit 3. In the illustrated exemplary embodiment, computer devices 8 are connected to a data bus 7. Electronic device 1 is also connected to data bus 7 via its communication unit 3. In this way, a data communication may take place between electronic unit 1 and external computer devices 8.

In the case of the remote I/O functionality, an external computer device 8 may control digital or analog output connection 4 via communication unit 3. Computer 6 receives a control command from external computer device 8 via communication unit 3 and controls digital or analog output connection 4 according to the control command. An external computer device 8 may read out an input value from digital or analog input connection 5 via communication unit 3. Computer 6 receives a readout command from external computer device 8 via communication unit 3, reads in the input value from digital or analog input connection 5 and transmits the input value to external computer device 8 via communication unit 3 with the aid of a reply message. In addition, the functionality of digital or analog output connection 4 and/or digital or analog input connection 5 may be set via parameters stored in parameter memory 12.

Figure 2:
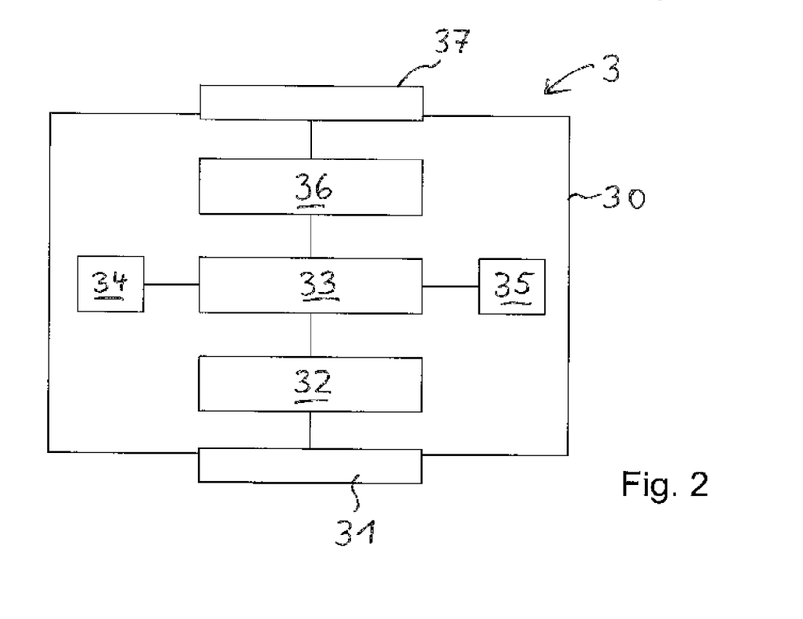
FIG. 2 shows a schematic representation of a communication module.

Communication unit 3 illustrated in FIG. 1 may be designed as an exchangeable communication module 30, for example as shown in FIG. 2. Communication module 30 includes an electrical plug connection 31, with the aid of which communication module 30 may be electrically connected to electronic device 1 and, in particular, to its control electronics 16. Communication module 30 includes a further electrical plug connection 37, with the aid of which communication module 30 may be connected to an external computer device 8 directly or indirectly, for example via data bus 7.

A separate control computer 33 may be present in communication module 30. In this case, it is advantageous if communication module 30 includes a separate program memory 34 and possibly also a separate parameter memory 35, these memories each being connected to control computer 33, so that control computer 33 may access the memory contents.

Communication module 30 has a gateway functionality, with the aid of which a bidirectional conversion takes place between an external communication protocol and/or physical layer used by external computer device 8 and an internal communication protocol and/or physical layer used between communication module 30 and computer 6. This bidirectional conversion is essentially carried out and controlled by control computer 33. For this purpose, control computer 33 is connected to plug connection 31, on the one hand, for example via an internal hardware interface 32, and to further plug connection 37, on the other hand, for example via an external hardware interface 36. A hardware-based signal adaptation between control computer 33 and the internal physical layer used may take place via internal hardware interface 32. A hardware-based signal adaptation between control computer 33 and the external physical layer used may take place via external hardware interface 36.

The structure of communication module 30 explained based on FIG. 2 is advantageous, in particular, if the internal communication protocol and the external communication protocol are significantly different and the gateway functionality is so complex that a separate control computer 33 is necessary. If the differences between the internal and external communication protocols are not so great, or if even identical communication protocols are used, communication module 30 may be designed without a separate control computer 33. In this case, program memory 34 and parameter memory 35 may also be omitted. If necessary, internal hardware interface 32 may be dispensed with, or it may be combined with external hardware interface 36.

Figure 3:
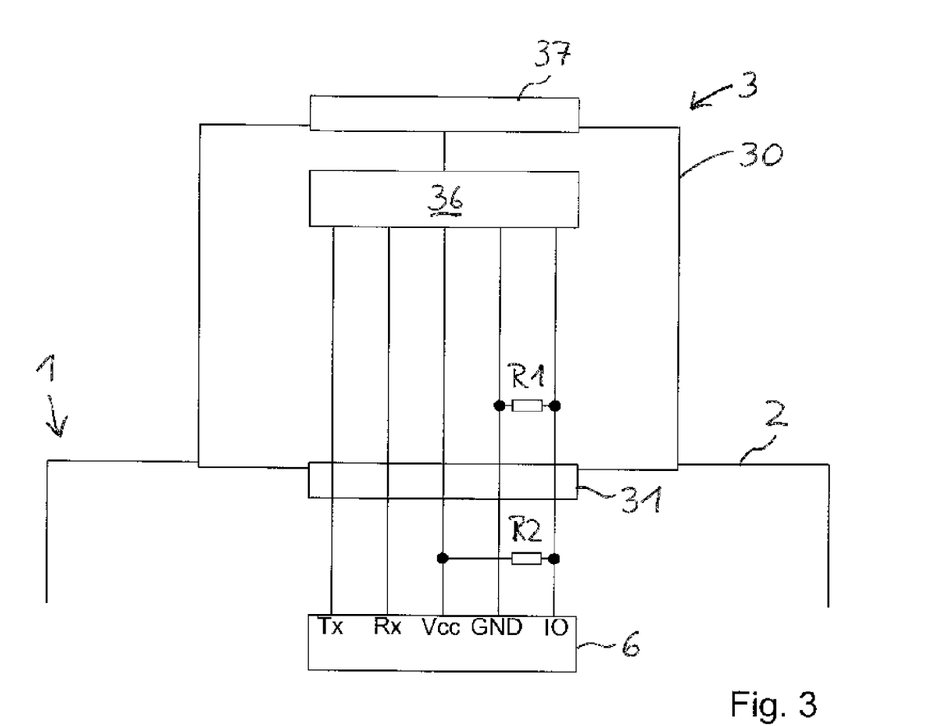
FIG. 3 shows a schematic representation of an electronic device and a communication module.

FIG. 3 shows such a design of a communication module 30 in connection with a representation of a detail of electronic device 1. Communication module 30 in this case is designed without a separate control computer. Communication module 30 then essentially includes only external hardware interface 36. Depending on the specific embodiment, certain activation functions of external hardware interface 36 may nevertheless have to be processor-controlled, which is not possible at that location in the absence of a separate control computer in communication module 30. In this regard, an advantageous specific embodiment is described based on FIG. 3, in which this processor-controlled activation of external hardware interface 36 may take place via computer 6 of electronic device 1.

An interface connection between computer 6 and external hardware interface 36 is illustrated, which may be designed, for example, in the form of a serial interface having a transmit line Tx and a receive line Rx. Electrical energy supply lines Vcc (operating voltage for hardware interface 36) and GND (ground line) are also shown. An I/O port of computer 6 is also illustrated, which may be operated as an output connection as well as an input connection. If the I/O port is operated as an output connection, computer 6 may control a control connection of external hardware interface 36 hereby, for example to set the transmit/receive data transmission direction. If the I/O port is operated as an input connection, a digital or analog signal may be read in via this connection.

FIG. 3 shows a hardware-based detection circuit, by means of which control electronics 16 or computer 6 may detect whether a communication module 30 including separate control computer 33 or a communication module 30 without a separate control computer 33 is connected to electronic device 1. Computer 6 may automatically establish hereby whether or not it must carry out the control functions via the output signals of the I/O port.

In this case, the hardware-based detection circuit includes a resistor R2 installed in electronic device 1, which establishes a connection between Vcc and the I/O port (pull-up resistor). A further resistor R1 is present in communication module 30, which establishes a connection between GND and the I/O port (pull-down resistor). Based on a voltage level read in via the I/O port, which sets in due to resistances R1/R2, computer 6 may detect that a communication module 30 without a separate control computer is connected. A corresponding communication module 30 including a separate control computer would be designed without a resistor R1 of this type, so that a different voltage level sets in at the I/O port, which computer 6 may also detect.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrical energy supply device for supplying electrical energy to electrical components from an energy source, the energy supply device comprising:
   at least one program memory with a computer program stored therein; and a computer for running the computer program, the computer program including software control functions for controlling power supply functions of the energy supply device; and at least one electronic overcurrent circuit breaker implemented in software with the aid of the computer program, wherein the electronic overcurrent circuit breaker is configured to:

cut off the output current output by the energy supply device; and limit the output current output by the energy supply device to a predetermined current value, wherein the electronic over-current circuit breaker has a monitoring of the output current output by the energy supply device for the exceeding of a limit current value, a cutoff of the output current or a limiting of the output current to a predetermined current value, taking place upon exceeding the limit current value, wherein the cutoff of the output current or the limiting of the output current takes place only after a preset tripping time, during which the output current exceeds the limit current value continuously or predominantly over time, and wherein the electronic overcurrent circuit breaker is implemented solely by the computer program without any additional hardware components.

2. The energy supply device according to claim 1, wherein the cutoff of the output current output by the energy supply device or the limiting of the output current output by the energy supply device takes place by controlling the energy supply device on the primary side.

3. The energy supply device according to claim 2, wherein the transformer is controlled directly on the primary side.

4. The energy supply device according to claim 1, wherein the electrical energy supply device is designed as a power supply unit as a switched-mode power supply and/or as an uninterruptible power supply.

5. The energy supply device according to claim 1, wherein the energy supply device includes a housing, on which mounting rail fastening elements are arranged, by means of which the energy supply device is adapted to be fastened to a mounting rail of the electrical installation system.

6. The energy supply device according to claim 1, wherein the energy supply device includes a parameter memory, in which parameters are stored for de-fining the functionality of the energy supply device, the electronic overcurrent circuit breaker being configurable by one or multiple of the parameters settable in the parameter memory as desired by the user.

7. The energy supply device according to claim 1, wherein the energy supply device is configured to signal the response of the overcurrent circuit breaker via a luminous feedback and/or via a communication interface.

8. The energy supply device according to claim 1, wherein the predetermined current value is the limit current value.

9. The energy supply device according to claim 4, wherein the power supply unit is a power supply unit of an industrial controller.

10. The energy supply device according to claim 4, wherein the power supply unit is a programmable logic controller.

11. The energy supply device according to claim 1, wherein cutoff of the output current or the limiting of the output current by the energy supply device is conducted by the primary control of the energy supply device.

12. The energy supply device according to claim 1, further comprising a communication device configured for communication with an external computer device.

13. The energy supply device according to claim 12, wherein the communication device is configured as an exchangeable communication module having gateway functionality.

14. An electrical energy supply device for supplying electrical energy to electrical components from an energy source, the energy supply device comprising:

at least one program memory with a computer program stored therein; and a computer for running the computer program, the computer program including software control functions for controlling power supply functions of the energy supply device; and at least one electronic overcurrent circuit breaker implemented in software with the aid of the computer program, wherein the electronic overcurrent circuit breaker comprises a function for cutting off the output current output by the energy supply device and/or a function for limiting the output current output by the energy supply device to a predetermined current value, wherein the electronic over-current circuit breaker has a monitoring of the output current output by the energy supply device for the exceeding of a limit current value, a cutoff of the output current or a limiting of the output current to a predetermined current value, taking place upon exceeding the limit current value, wherein the cutoff of the output current or the limiting of the output current takes place only after a predetermined tripping time, during which the output current exceeds the limit current value continuously or predominantly over time, and wherein a communication device is configured to read out an identifier, which indicates a device type of an electronic device, from control electronics of the electronic device via an internal communication protocol, and to transmit the identifier to the external computer device via an external communication protocol.

15. An electrical energy supply device for supplying electrical energy to electrical components from an energy source, the energy supply device comprising:

at least one program memory with a computer program stored therein; and a computer for running the computer program, the computer program including software control functions for controlling power supply functions of the energy supply device; and at least one electronic overcurrent circuit breaker implemented in software with the aid of the computer program, wherein the electronic overcurrent circuit breaker comprises a function limiting the output current output by the energy supply device to a predetermined current value, wherein the limiting of the output current takes place only after a preset tripping time, during which the output current exceeds a limit current value continuously or predominantly over time, and wherein the electronic overcurrent circuit breaker is implemented solely by the computer program without any additional hardware components.

16. An electrical energy supply device for supplying electrical energy to electrical components from an energy source, the energy supply device comprising:

at least one program memory with a computer program stored therein; and a computer for running the computer program, the computer program including software control functions for controlling power supply functions of the energy supply device; and at least one electronic overcurrent circuit breaker implemented in software with the aid of the computer program, wherein the electronic overcurrent circuit breaker is configured to:

cut off the output current output by the energy supply device; and limit the output current output by the energy supply device to a predetermined current value, wherein the cutoff of the output current or the limiting of the output current takes place only after a preset tripping time, during which the output current exceeds a limit current value continuously or predominantly over time, and wherein the electronic overcurrent circuit breaker is implemented solely by the computer program without any additional hardware components.

17. The energy supply device according to claim 1, further comprising a communication device configured to read out an identifier, which indicates a device type of an electronic device.

18. The energy supply device according to claim 17, wherein the communication device is further configured to transmit the identifier to an external computer device via an external communication protocol.

19. The energy supply device according to claim 1, wherein the cutoff of the output current or the limiting of the output current is permanent.

20. The energy supply device according to claim 1, wherein the cutoff of the output current or the limiting of the output current is temporary.

21. The energy supply device according to claim 6, wherein the parameters include tripping time and limit current value.

22. An electrical energy supply device for supplying DC electrical energy to electrical components from an AC energy supply network, the energy supply device comprising:

a program memory with a computer program stored therein;

a computer for running the computer program, the computer program including software control functions for controlling power supply functions of the energy supply device;

an electronic overcurrent circuit breaker implemented in software with the aid of the computer program; and a parameter memory, in which parameters are stored for defining the functionality of the energy supply device, the electronic overcurrent circuit breaker being configurable by one or multiple of the parameters settable in the parameter memory as selected by a user, wherein the electronic overcurrent circuit breaker is configured to:

cut off the output current output by the energy supply device; and/or limit the output current output by the energy supply device to a predetermined current value, wherein the electronic over-current circuit breaker monitors the output current output by the energy supply device for the exceeding of a limit current value, a cutoff of the output current or a limiting of the output current to a predetermined current value taking place upon exceeding the limit current value, wherein the cutoff of the output current or the limiting of the output current takes place only after a preset tripping time, during which the output current exceeds the limit current value continuously or predominantly over time, wherein by setting the preset tripping time in the parameter memory a fast-acting or a slow-acting circuit breaker characteristic may be set by the user, and wherein the energy supply device is designed as a power supply unit of a programmable industrial-controller.

* * * * *